Jan. 5, 1960 CHIEN-BOR SUNG 2,919,682
LINEAR FLUID ACTUATOR
Filed March 21, 1958 2 Sheets-Sheet 1

INVENTOR.
CHIEN BOR SUNG
BY
ATTORNEY

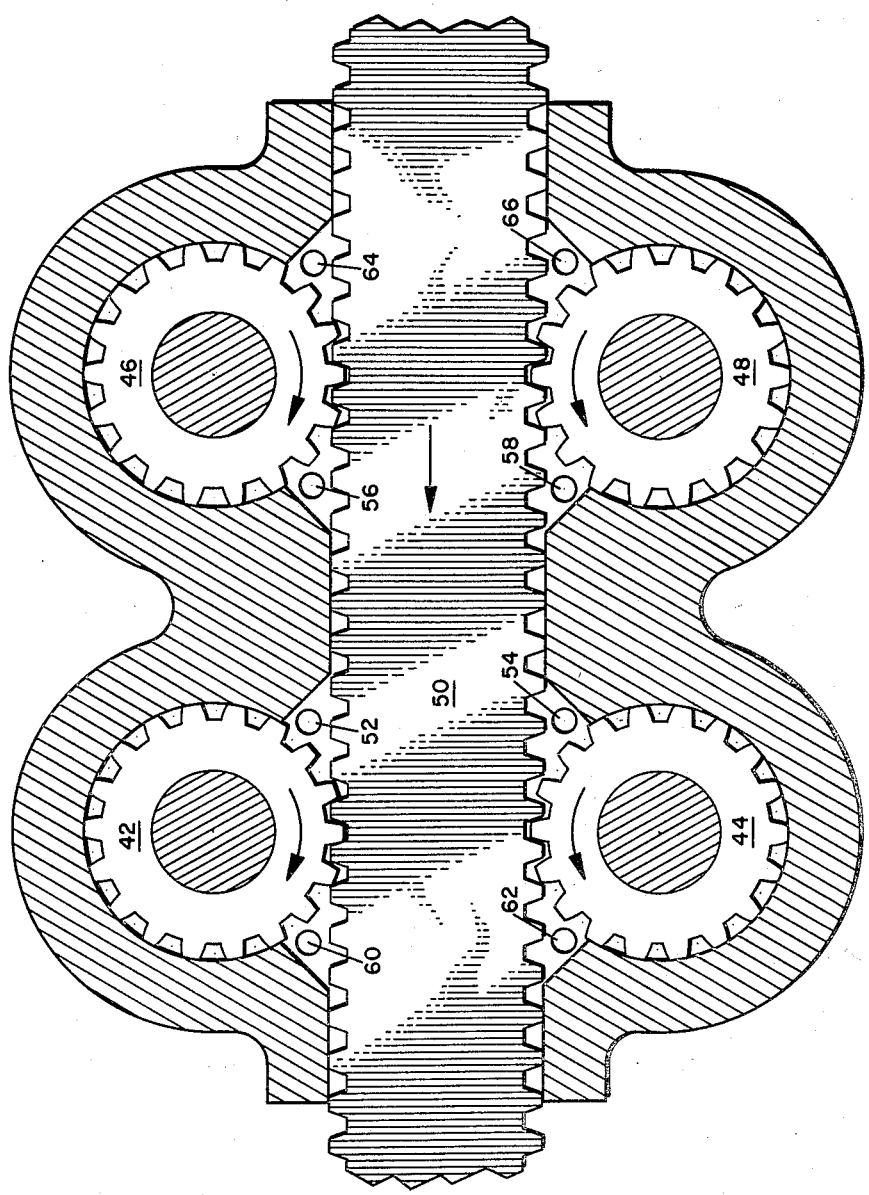

United States Patent Office 2,919,682
Patented Jan. 5, 1960

2,919,682

LINEAR FLUID ACTUATOR

Chien-Bor Sung, Oak Park, Mich., assignor to Bendix Aviation Corporation, Detroit, Mich., a corporation of Delaware Application March 21, 1958, Serial No. 722,993

6 Claims. (Cl. 121—70)

This invention relates to a positive displacement type linear fluid actuator.

Piston type linear fluid actuators, which are well known in the art, have been used successfully for a wide variety of applications. For applications where a relatively long stroke is required, the stiffness of the piston type linear fluid actuator is low because of the relatively large volume of fluid under compression. In such applications the pistons must be made relatively large in area in order to minimize the compressibility effects. As a result of this requirement, a large power supply is required to provide a high flow rate. In many cases, however, even the use of the largest practical piston area would still not make the system stiff enough to provide adequate dynamic response.

This invention relates to a positive displacement type linear fluid actuator in which the volume of fluid under pressure is small and is independent of the length of stroke, thus providing a high degree of stiffness. In accordance with the invention, an annular gear and a straight rack in mesh with the gear are subjected to fluid under pressure to produce a rotation of the gear and a corresponding linear movement of the rack. The actuator is extremely simple in construction and reliable in its operation.

An object of this invention is to provide a new and improved positive displacement type linear fluid actuator.

Another object of this invention is to provide an actuator of the above character in which an annular gear and a straight rack in mesh with the gear are subjected to fluid pressure to control the linear movement of the rack.

A further object of this invention is to provide an actuator of the above character wherein the volume of fluid under pressure is very small and is independent of the length of stroke, thus assuring a high degree of stiffness.

Other objects and advantages will become apparent from the following detailed description and from the appended drawings and claims.

In the drawings:

Figure 2 is a cross sectional view of another embodiment of this invention.

Figure 1:
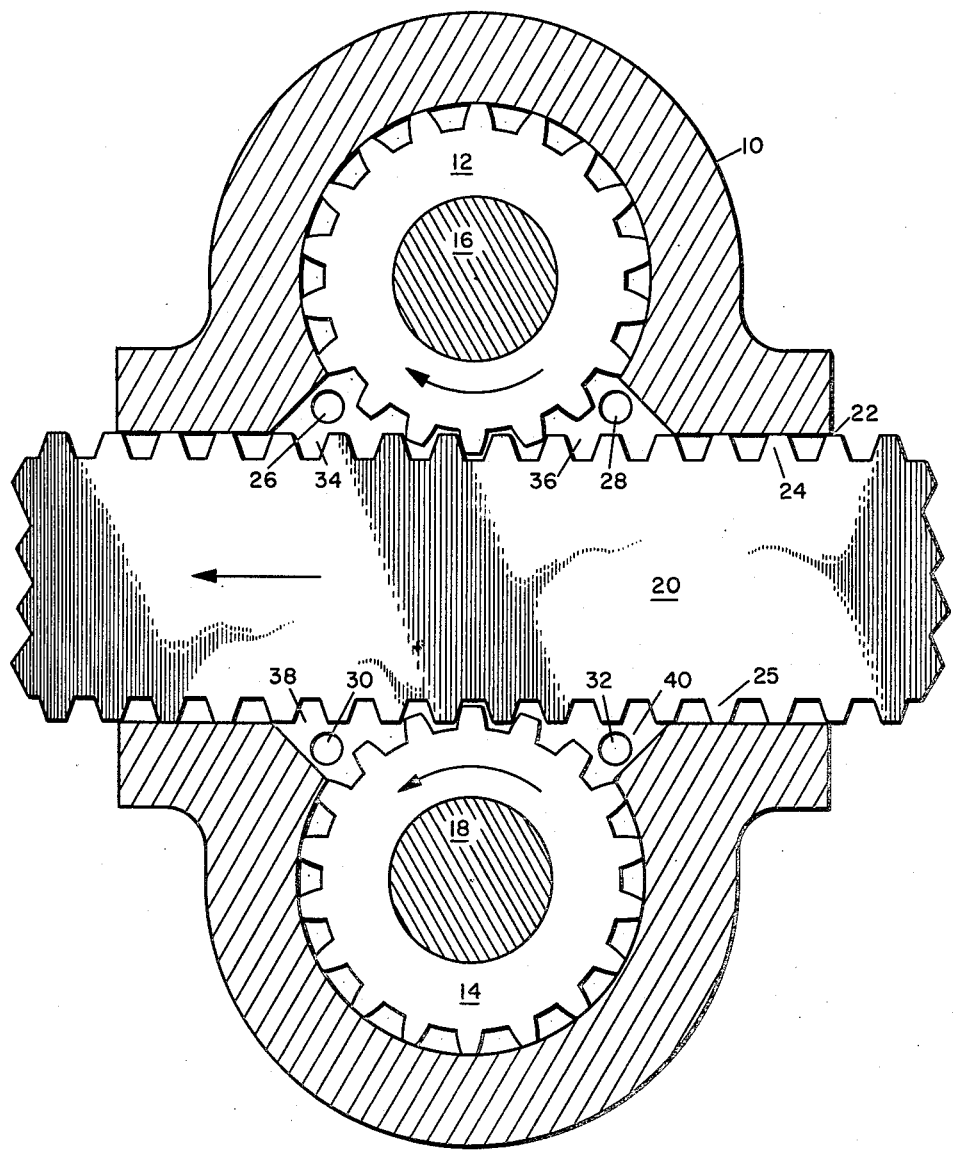
Figure 1 is a cross sectional view of one embodiment of this invention.

In the embodiment of Figure 1, a housing 10 encloses a pair of pinions or annular gears 12 and 14 retained on shafts 16 and 18, respectively. Both ends of the shafts 16 and 18 are suitably journaled into the housing 10 for rotating the gears 12 and 14 within the housing. The gear teeth on the gears 12 and 14 cooperate closely with the inner surface of the housing 10 to provide fluid seals between the teeth and the housing.

A straight rack 20 extending through an opening 22 in the housing 10 is provided with upper gear teeth 24 in mesh with the gear 12 and with lower gear teeth 25 in mesh with the gear 14. The teeth 24 and 25 and the sides of the rack 20 cooperate closely with the housing 10 to provide fluid seals. Fluid ports 26, 28, 30 and 32 extend through the housing 10 and communicate with the fluid chambers 34, 36, 38 and 40. Ports 26 and 30 have a common connection (not shown) in the housing 10 and the ports 28 and 32 also have a common connection (not shown) in the housing.

In operation, when fluid such as air under pressure is introduced through the ports 26 and 30 into chambers 34 and 38, the gears 12 and 14 are rotated in the direction shown by the arrows and the rack 20 is moved to the left a distance corresponding to the angular displacement of the gears. During rotation of the gears 12 and 14 and the movement of the rack 20, exhaust air is removed from the chambers 36 and 40 through the ports 28 and 32. The rotation of the gears 12 and 14 and the movement of the rack 20 are produced in accordance with the principles applicable to rotary gear type fluid motors which are well known to persons skilled in the art.

It will be noted that during rotation of the gears 12 and 14, the volume of each of the chambers 34, 36, 38 and 40 remains small and substantially constant. Therefore, the volume of air under pressure in the chambers 34 and 38 and the volume of air at exhaust in the chambers 36 and 40 remains small and substantially constant. This assures a constant, high degree of stiffness in the system throughout the range of its operation. In this configuration it is obvious that the volume of fluid under pressure (or the degree of stiffness) is independent of the length of stroke of the device.

If it is desired to actuate the rack 20 to the right, air under pressure is introduced to the chambers 36 and 40 through the ports 28 and 32 to drive the gears 12 and 14 in a direction opposite to that described above. By utilization of control means, such as an electronically operated servo valve, air under pressure may be introduced to either the chambers 34 and 38 or to the chambers 36 and 40 in accordance with the magnitude and polarity of an electrical signal applied to the servo valve to control the movement of the rack 20.

Since the actuator disclosed above includes members (gears 12 and 14) which rotate and a member (rack 20) which moves linearly, either a rotary or linear instrument can be used to measure directly the motion of the actuator without the use of an intermediate mechanism as is required with other type actuators.

Although in Figure 1 a pair of symmetrically arranged gears 12 and 14 are used to drive the rack 20, a single gear cooperating with one side of the rack may also be used. For example, the gear 12 alone in mesh with the teeth 24 could drive the rack 20 if the bottom side of the rack was made smooth so as to move along a bearing surface or on roller bearings. Also, the actuator in Figure 1 may be operated with hydraulic fluid instead of gas. However, because of the leakage that would occur through the opening 22 from the chambers 34, 36, 38 and 40, the actuator should preferably be immersed in the hydraulic fluid.

In the embodiment of Figure 2, two pairs of symmetrically arranged annular gears 42, 44, 46 and 48 are used to drive a rack 50 to prevent any backlash. In this anti-backlash application, fluid ports 52 and 54 have a common connection (not shown) which communicates with fluid at one pressure and fluid ports 56 and 58 have a common connection (not shown) which communicates with fluid at another pressure level. Fluid ports 60, 62, 64 and 66 have a common connection (not shown) which is connected to an exhaust line. When the fluid pressure in the chambers 56 and 58 is higher than that in the chambers 52 and 54, the rack 50 will move in the direction shown by the arrow. The rack 50 would move in the opposite direction if the pressure in the chambers 52 and 54 is made higher than the pressure in the chambers 56 and 58.

To provide the above anti-backlash feature, there need be only a pair of gears such as gears 42 and 46 on one side of the rack. The other side of the rack would in such case have no gear teeth but a smooth surface so as to move on a bearing or on roller bearings as previously described in connection with the embodiment in Figure 1.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

Having thus described my invention, I claim:

1. A linear actuator, including, a straight rack having gear teeth on at least one of its sides, first and second gears displaced from each other in the longitudinal direction of the rack and in mesh with the teeth on the rack, said first gear and said rack adapted to receive a first fluid pressure for producing a rotation of the gear and a corresponding relative linear movement of the rack, said second gear and said rack adapted to receive a second fluid pressure, the second fluid pressure being lower than the first fluid pressure and being applied in a direction opposite to the direction in which the first fluid pressure is applied so as to prevent any backlash in the relative motion of the first gear and the rack.

2. A linear actuator, including, a straight rack having gear teeth on first and second sides, first and second gears displaced from each other in the longitudinal direction of the rack and in mesh with the teeth on the first side on the rack, third and fourth gears displaced from each other in the longitudinal direction of the rack and in mesh with the teeth on the second side of the rack, said first gear and said rack adapted to receive a first fluid pressure, said third gear and said rack adapted to receive said first fluid pressure, whereby a rotation of the gears and a corresponding relative linear movement of the rack is produced, said second gear and said rack adapted to receive a second fluid pressure, said fourth gear and said rack adapted to receive said second fluid pressure, the second fluid pressure being lower than the first fluid pressure and being applied in a direction to cause movement between the gears and rack opposite to the movement caused by the first fluid pressure so as to prevent any backlash.

3. A linear actuator including a rotatable gear member having teeth formed thereon, a straight rack member having teeth formed on one side thereof and in mesh with the gear member teeth, a housting member having separate plane surfaces sealingly engageable with the crests on the rack teeth on either side of said gear member, said housing having a concave arcuate portion intermediate and joining with said plane surfaces and sealingly engageable with the crests of a plurality of said gear teeth, first areas adjacent the sealing engagements of the housing with said gear teeth and the back teeth on either side of said gear, each of said first areas adapted to receive fluid pressure so that said gear and housing are driven relative to each other in one direction when pressure is introduced at one of said areas and in an opposite direction when pressure is introduced at the other of said areas to provide a reversible actuator.

4. The actuator of claim 3 wherein said rack has teeth formed on an opposite side, a second gear having teeth formed thereon in mesh with said teeth on said opposite side, a second housing having separated plane surfaces sealingly engageable with the crests of the teeth formed on said opposite side, said second housing having a concave arcuate portion intermediate and joining with said separated plane surfaces and sealingly engageable with the crests of a plurality of said second gear teeth, second areas adjacent the sealing engagements of said housing with said second gear teeth and the rack teeth on either side of said second gear, each of said second areas adapted to receive fluid pressure so that said gear and housing are driven relative one another in one direction when pressure is introduced at one of said second areas and in an opposite direction when pressure is introduced at the other of second said areas.

5. A linear pneumatic motor comprising a linear member, a rotary member being drivingly engaged with the linear member, a housing member having separated plane surfaces sealingly engageable with portions of said linear member on either side of said rotary member, said housing having a central portion intermediate and joining with said plane surfaces and sealingly engageable with a portion of said rotary member, pressure receiving areas adjacent said sealing engagements of said housing with said rotary member and said linear member on either side of said rotary member, said areas adapted to receive pneumatic pressure so that said rotary and linear members are driven relative one another in one direction when pressure is introduced at one of said areas and in an opposite direction when pressure is introduced at the other of said areas to provide a reversible actuator, said areas being of a substantially constant dimension so that said actuator has substantially constant high response operating characteristics for all lengths of drive strokes.

6. A linear actuator including a rotatable gear member having teeth formed thereon, a straight rack member having teeth formed on one side thereof and in mesh with the gear member teeth, a sealing member having a plane surface sealingly engageable with and movable along the crests on the rack teeth, said sealing member having an arcuate portion in sealing engagement with at least two of said gear member teeth at all times, a pressure receiving area adjacent the sealing engagements of said sealing member with said rack teeth and said gear teeth, said area adapted to receive fluid pressure for causing relative movement between said gear and said rack.

References Cited in the file of this patent

UNITED STATES PATENTS

| | | |
|---|---|---|
| 981,862 | Keats | Jan. 17, 1911 |
| 1,937,367 | Vickers | Nov. 28, 1933 |
| 2,240,874 | Thomas et al. | May 6, 1941 |